United States Patent [19]

Okada

[11] Patent Number: 4,862,437
[45] Date of Patent: Aug. 29, 1989

[54] MAGNETO-OPTICAL RECORDING REPRODUCING, AND ERASING APPARATUS HAVING TWO INDEPENDENT MAGNETIC FIELD APPLYING DEVICES

[75] Inventor: Mitsuya Okada, Tokyo, Japan
[73] Assignee: NEC Corporation, Tokyo, Japan
[21] Appl. No.: 165,353
[22] Filed: Feb. 29, 1988

Related U.S. Application Data

[63] Continuation of Ser. No. 791,952, Oct. 28, 1985, abandoned.

[30] Foreign Application Priority Data

Oct. 26, 1984 [JP] Japan .................. 59-225235

[51] Int. Cl.⁴ ............... G11B 13/04; G11B 11/12; G11B 11/10
[52] U.S. Cl. .................. 369/13; 360/59; 360/114; 365/122; 369/100
[58] Field of Search .............. 369/13, 100; 360/59, 360/14; 365/122, 32

[56] References Cited

U.S. PATENT DOCUMENTS

| | | | |
|---|---|---|---|
| 4,477,852 | 10/1984 | Ota et al. ................. | 360/114 |
| 4,495,530 | 1/1985 | Yanagida ................. | 369/13 |
| 4,610,009 | 9/1986 | Connel .................... | 369/14 |
| 4,612,587 | 9/1986 | Kaneko et al. .......... | 360/59 |

FOREIGN PATENT DOCUMENTS

| | | | |
|---|---|---|---|
| 55-129908 | 10/1980 | Japan ..................... | 360/59 |
| 59-172175 | 9/1984 | Japan ..................... | 369/13 |
| 59-178602 | 10/1984 | Japan ..................... | 360/114 |

*Primary Examiner*—Alan Faber
*Assistant Examiner*—James E. Tomassini
*Attorney, Agent, or Firm*—Sughrue, Mion, Zin, Macpeak & Seas

[57] ABSTRACT

An apparatus for recording, reproducing and erasing data or information on a magneto-optical recording medium, for applying a steady magnetic field to the recording medium and for applying a variable magnetic field, a portion of the apparatus for applying the magnetic field being integrated into a recording head and and the record head being disposed on different sides of the recording medium, this results in the miniaturization of the means for applying the magnetic field to the recording medium and the apparatus presents an excellent recording/erasure property.

7 Claims, 6 Drawing Sheets

MAGNETO-OPTICAL RECORDING REPRODUCING, AND ERASING APPARATUS HAVING TWO INDEPENDENT MAGNETIC FIELD APPLYING DEVICES

This is a continuation of application Ser. No. 791,92 filed Oct. 28, 1985 now abandoned.

BACKGROUND OF THE INVENTION

1. Field of the Invention

The present invention relates to an apparatus for magneto-optically recording, reproducing and erasing data on a magneto-optical recording medium utilizing a laser beam.

2. Description of the Prior Art

When treating various kinds of data or information, recording, display and reproduction are the essential technique many techniques have been developed. For instance, there an image tube, a solid image element, a sensor array or the like are means for reading. As the display means, a cathode ray tube, optical projector, and plasma displays and a printer, such as, an electrostatic printer and an ink jet printer may be employed. As the recording means, a magnetic disc, a tape, a drum, a magnetic bubble element and a semiconductor memory may be employed.

These means for reading, recording and displaying have substantially been improved in their degree of resolution, the speed of recording, reproduction and reading or the like, due to the development of laser techniques which provide a strong and fine light beam and thus, many machines and devices utilizing such laser techniques have been developed.

Among others, an optical memory material capable of rewriting information or data has attracted interest many studies to develop magneto-optical recording materials have been done in recent years.

When recording and reproducing information on an magneto-optical disc, a static magnetic field is applied to the surface of the disc, on which a crystalline or amorphous layer of magnetic materials is deposited to act as a recording medium, to induce a perpendicular magnetized layer on the disc, the magnetization of which is oriented to the same direction due to the static magnetic field applied. Then, information or data is recorded on the surface by a laser spot while applying a weak magnetic field to a desired position of the recording medium having a direction of magnetization opposite to that of the previously magnetized layer. At this stage, the temperature of the layer partially rises over Curie point by the irradiation of a laser beam and as a result the magnetization at that point is reversed and the recording of information or data is completed. The information recorded on the magneto-optical recording disc may be reproduced by irradiating a laser beam to the surface layer of the magneto-optical disc, detecting the degree of rotation of the plane polarized due to Kerr effect or that polarized due to Faraday effect of the recording medium through an analyzer disposed in the light path, as the strength of transmitted or reflected light. The record medium generally comprises a disc of plastics or glass as the substrate and an amorphous alloy layer composed of a rare earth metal such as gadolinium (Gd), terbium (Tb), dysprosium (Dy) and holmium (Ho) and a transition metal such as iron (Fe), cobalt (Co) and nickel (Ni), for instance, Gd-Fe, Gd-Co, Tb-Fe, Tb-Gd-Fe.

Such magneto-optical materials must fulfill the following requirements:

(i) it must be a material such that the magnetization may easily be reversed at a relatively low temperature to improve the sensitivity of the recording medium during recording;

(ii) it must have a rather high Kerr rotational angle to increase the S/N ratio of the reproduction signals;

(iii) on the surface thereof, a perpendicular magnetized layer may be formed, which makes it possible to record information in more higher record density.

In order to carry out the magneto-optical recording of information or data, it is necessary to change the direction of the magnetic field to be applied to the disc at the time of recording and erasing information and therefore, as the means for applying magnetic field, an electromagnetic, a permanent magnet or an air-core coil is generally used. However, since the strength of the magnetic field required for recording information usually differs from that of the magnetic field required for erasing recorded information, it is necessary to change not only the direction of the current supplied to the electromagnetic and the air-core coil but the strength thereof to switch from recording to erasing and vice versa. The performance of the electromagnet and the air-core coil is generally defined by their maximum values of the generated magnetic field requirements and as a result, a large-sized electromagnet and air-core coil are needed as well as the use of a power supply having a complicated construction.

Furthermore, if a permanent magnet is used, the apparatus for recording, reproducing and erasing information or data must be provided with a driving mechanism to move the magnet and to reverse the magnetic field and this makes the construction of the apparatus quite complicated.

BRIEF DESCRIPTION OF THE INVENTION

Under such circumstances, the inventor of this application has eagerly studied apparatuses for recording, reproducing and erasing information to solve the problems accompanied by the conventional apparatuses and has found that these problems may be solved by dividing the means for applying a magnetic field to a recording medium into two different elements and integrating them into a recording head of the apparatus.

A principal purpose of this invention is to provide an apparatus for recording, reproducing and erasing information or data utilizing a laser beam, which makes it possible to solve the problems accompanied by the conventional apparatus.

Another purpose of this invention is to provide a new apparatus for recording, reproducing and erasing information or data using a laser beam, capable of applying a magnetic field required to record and erase information and having a simple construction and a miniaturized means for applying a magnetic field.

These and other purposes of the present invention may be accomplished by providing an apparatus for recording, reproducing and erasing information or data, which makes it possible to record, reproduce and erase information or data by irradiating a laser beam on a recording medium comprised of a thin film of ferrimagnetic material having perpendicular magnetic anisotropy, characterized by first means for applying a steady magnetic field and second means for applying a variable magnetic field, the first means being separated from the second means.

BRIEF DESCRIPTION OF THE ATTACHED DRAWINGS

The apparatus according to the present invention is now explained in more detail with referring to the accompanying drawings in which:

FIG. 1 (a) shows an oblique diagram of part of a conventional apparatus for recording, reproducing and erasing information or data and FIG. 1 (b) is the same diagram as FIG. 1 (a) showing part of another conventional apparatus;

FIG. 2 (a) shows an oblique diagram of a part of a preferred embodiment of the apparatus according to the present invention, FIG. 2 (b) shows a front view of another preferred embodiment of the present invention, FIG. 2 (c) shows the same diagram as FIG. 2 (b) of the third preferred embodiment of the present invention and FIG. 2 (d) shows a vertical sectional view of the apparatus shown in FIG. 2 (aa;

FIGS. 3(a) and 3(b) show more detailed structure for certain elements in FIGS. 2(a)–(d);

FIG. 4 shows a graph which represents the recording property of the magneto-optical disc used in the present invention when data are recorded utilizing the apparatus according to the present invention; and FIG. 5 is a graph which shows the re-recording property of the magneto-optical disc when applying the apparatus according to the present invention.

DETAILED EXPLANATION OF THE INVENTION

Referring now to FIGS. 1 (a) and (b), two different types of conventional apparatuses, in particular a recording disc and a magnetic recording head, are disclosed. The apparatus shown in FIG. 1 (a) comprises a means for driving a recording disc 1 such as a motor, a magnetic record head 2 which serves to record, reproduce and erase data using a laser beam, and a means for applying a magnetic field, in this case, a permanent magnet 3 being used, which may also be an electromagnetic or an air-core coil. The head 2 is provided with an actuator 4 for a condenser lens system and focusing the laser beam 5 to a desired region to record, reproduce or erase data. The head 2 is movably supported by, a support (not shown) which provides for radial movement of the head. for positioning the head 2 over the desired data tracks and for permitting random access of data.

According to the apparatus shown in FIG. 1 (a), the recording of data on the magnetic recording medium is carried out, for instance, by heating the part on which data are recorded, to a temperature higher than the Curie point using a laser beam to extinguish magnetization thereon and cooling the portion below the Curie point while applying a external magnetic field thereto to change the direction of magnetization at that portion. The recording of information or data is also possible by utilizing the fact that ferrimagnetic material has a low coercive force around the compensating temperature thereof. That is, recording may be carried out by partially heating the recording medium having a compensating temperature near the room temperature and reversing its magnetization by applying an external magnetic field higher than the coercive force of the recording medium to record data.

On the other hand, the data recorded may be reproduced by irradiating a light beam to a desired portion of the recording medium and detecting the strength of the transmitted light or reflected light. In this connection, the polarized plane of the transmitted or reflected light is rotated to the right or left according to the magnetization direction of the recorded portion. Thus, if a polarizer is disposed so that the rotational axis thereof is perpendicular to the rotational direction of the polarized plane, only the recorded pit having a desired direction of magnetization can be detected.

In addition, the erasure of data recorded may be carried out by repeating the recording procedure except that the direction of the external magnetic field to be applied is reversed.

In FIG. 1 (b), another conventional apparatus for recording, reproducing and erasing data is shown. In this apparatus, an air-core coil 11 is used instead of a permanent magnet 3 [see FIG. 1 (a)]. In this case, the coil 11 is integrated into the head 2 while the magnet 3 and the head 2 are disposed on the opposite sides of the disc 6 [see FIG. 1 (a)]. The other elements of the apparatus are the same as those disclosed in FIG. 1 (a) and therefore, the same reference numbers as assigned as in FIG. 1 (a).

However, a conventional apparatus typically represented by these two examples shown in FIGS. 1 (a) and 1 (b) has a lot of problems to be solved, and there remains a sufficient room for improvement.

As already mentioned above, the direction of the external magnetic field applied while recording data on the recording medium differs from that of the magnetic field applied during erasing the recorded data. Therefore, it is necessary to change the direction of the external magnetic field when switching from recording to erasing. For that purpose, it is necessary to change not only the direction of electric current to be supplied to the electromagnet or the air-core coil used, but also the strength thereof. Furthermore, a large electromagnet or air-core coil must be used, since a means for applying a magnetic field to the recording medium having a high magnetic field requirement is effectively used in the magneto-optical recording apparatus. As a result, the construction of the power supply is complicated.

The permanent magnet must be provided with a driving mechanism to move the magnet and to reverse the direction of the magnetic field. The reversal of the direction of the magnetic field is needed and carried out when recorded data are erased or data are re-recorded after the erasure of the previously recorded data. This also makes the structure of the apparatus more complicated.

However, according to an apparatus of the present invention explained below more concretely, referring to the accompanying drawings which show different preferred embodiments of this invention, these disadvantages of the conventional apparatus can effectively be eliminated. In addition, the features of the invention will become apparent to those skilled in the art as the disclosure is made in the following detailed description of preferred embodiments of this invention.

DESCRIPTION OF THE PREFERRED EMBODIMENTS

Figure 1A:
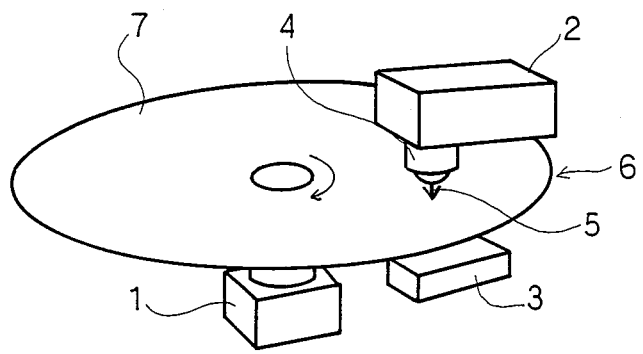
Figure 1B:
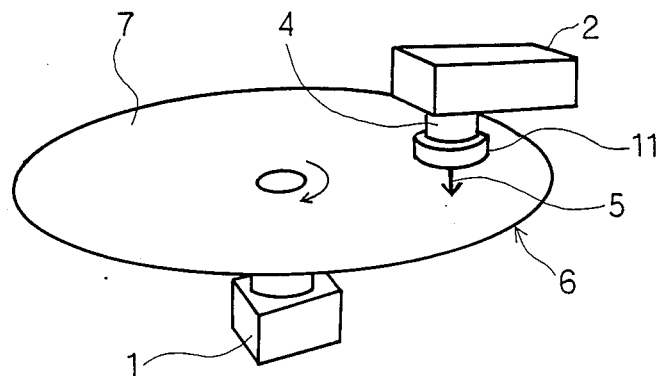
Figure 2A:
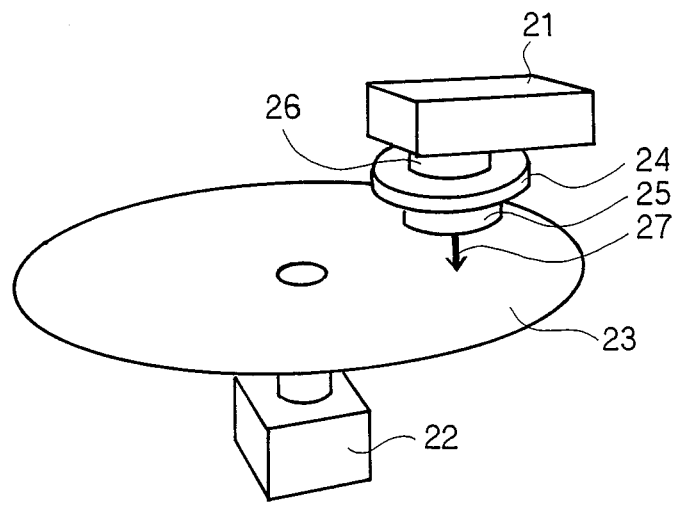
Figure 2D:
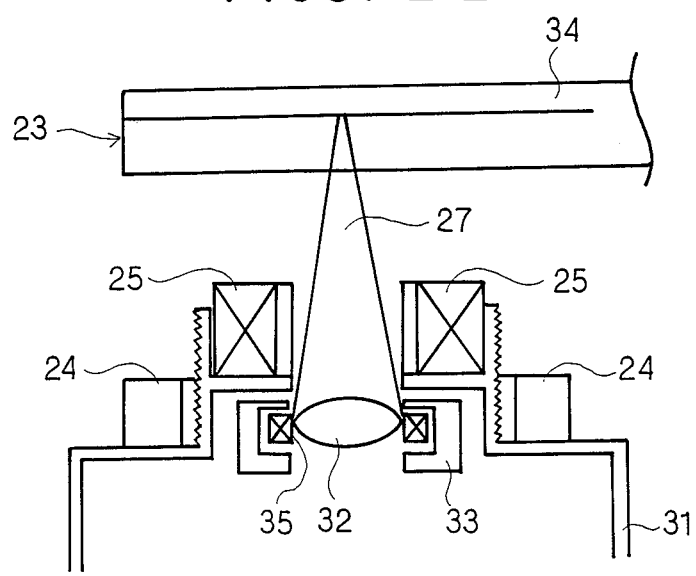
Figure 2B:
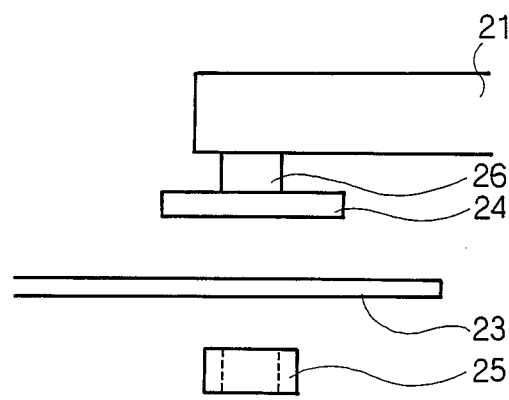
Figure 2C:
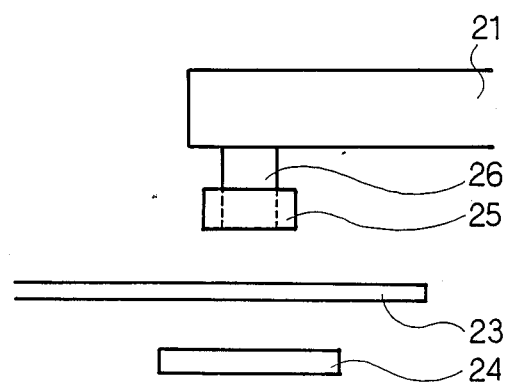

FIG. 2 (a) shows a preferred embodiment of the present invention. The apparatus comprises a magnetic recording head 21, a means 22 for driving a disc 23, a means 24 for applying a steady magnetic field to the disc surface, which may be a permanent magnet, an air-core coil or an electromagnet and disposed on the head 21 at its extremity, a means 25 for applying a variable magnetic field to the disc surface, which may be of an air-core coil or an electromagnet and may be disposed below the magnet 24, and an actuator 26 disposed between the head 21 and the magnet 24. In this apparatus, a laser beam 24 is also used to record, reproduce and erase data on the disc 23. The laser beam is adjusted by the actuator 26 for the condenser lens incorporated therein.

The apparatus according to the present invention is characterized in that the magnets 24 and 25 are integrated into the head 21. The magnets 24 and 25 integrated into the head 21 may be disposed on the same side of the recording disc 23 [see FIG. 2 (a)] or on the different sides of the record disc 23 [see FIGS. 2 (b) and (c)].

Referring now to FIG. 2 (d) which presents a vertical sectional view of the mechanism for driving the means for applying a magnetic field to the recording medium shown in FIG. 2 (a), the driving mechanism comprises a support 31 of the magneto-optical head, the magnets 24 and 25 being engaged in or with the support 31 in this order, the support 31 being provided with a condenser lens system 32 in its inner portion and the lens system 32 being supported by a driving mechanism 33 therefor. With the lens system 32 and the driving mechanism 33, a laser beam may be shifted and focused on the desired position of the recording medium 23 on which data are recorded, reproduced or erased. The recording is practically effected on the magneto-optical recording layer 34. In the embodiment, the condenser lens system 32 is supported and driven by an actuator 35 for driving the lens system 32, such as a voice coil. Furthermore, the permanent magnet 24 is mated with the outer surface of the support 31 so that the distance between the magnet 24 and the lower surface of the record medium 23 can be adjusted.

In general, the distance between the upper surface of the magnet 25 (or, in some cases, the magnet 24) and the lower surface of the recording medium 23 varies depending on the focal length of the lens system 32 used. For example, for a lens having a focal length of 2 to 3 mm, the distance falls within the range of from 0.2 mm to 2 mm, most preferably about 1 mm. If the distance is less than the lower limit of 0.2 mm, the magnet 25 may eventually contact the surface of the recording medium and crush it. On the other hand, if the distance is more than the upper limit of 2 mm, maintaining sufficient sensitivity in recording, reproducing and erasing data on the recording medium cannot be assured.

Figure 3A:
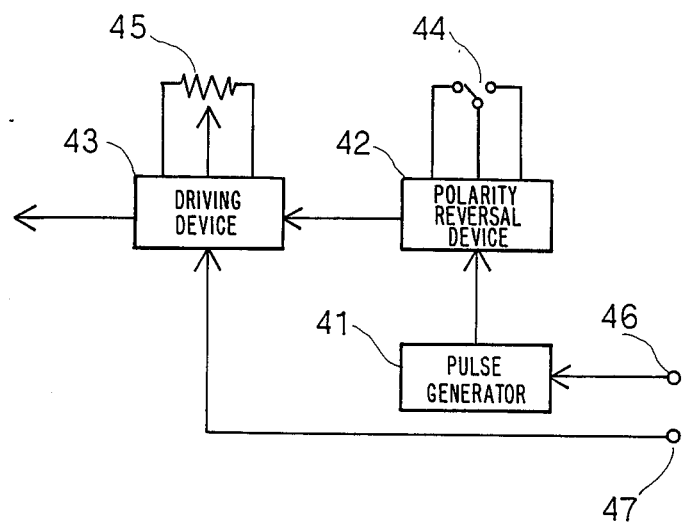
Figure 3B:
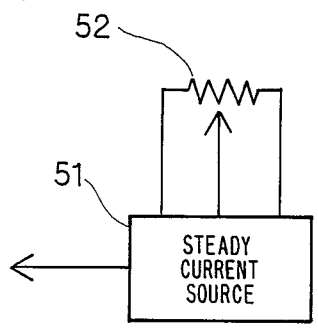

The means 24 for applying a steady magnetic field to the recording disc 34 may, for example, be controlled according to a control system shown in FIG. 3 (a), which comprises a pulse generator 41, a device 42 for reversing the polarity of the pulse generated by the generator 41 and a driving device 43 for the coil 25, the device 42 for reversing the polarity of the pulse being provided with a switch 44 which serves to change the recording state to the erasing state and vice versa, the driving device 43 for the coil being provided with a variable resistance device 45 capable of establishing a desired level of the coil driving current.

The pulse generator 41 of the control system generates high frequency pulses synchronized with disc rotation, based on a pulse 46 synchronized with the disc rotation and inputted to the generator 41 so that a desired pit recording density may be attained at a given disc rotational velocity. The output of the pulse generator 41 is inputted to the device 42 for reversing the polarity of the pulse inputted. The device 42 is controlled by the switch 44 which serves to switch between the record stage and erasure stage and outputs a pulse having a desired polarity. The driving device 43 receiving the pulse outputted by the device 42 is triggered with a recording/erasing trigger pulse separately inputted at 47 and outputs an amplified pulse. The current level outputted from the driving device 43 is set in accordance with the variable resistance device 45 attached to the device 43.

Thus, a pulse for driving the coil is outputted from the device 43 and the pulse makes it possible to synchronize with the rotation of the disc and to erase data or record data at a desired pit density. In addition, the polarity of the pulse for driving the coil is controlled by the changeover switch 44 and the strength of the pulse for driving the coil is adjusted by the variable resistance device 45.

While, referring to FIG. 3 (b), a control system for the means 24 for applying a steady magnetic field to the recording medium is described as a block diagram. If the means 24 is an electromagnet or an air-core coil, a steady current source 51 is provided for the system and the output thereof is inputted to the electromagnet. A variable resistance device 52 is provided with the steady current source 51 to control the current outputted from the source 51. Therefore, it is possible to supply a desired strength of current to the electromagnet or the air-core coil which constitutes the means for applying a steady magnetic field to the record medium, due to the control of the variable resistance device 52. Moreover, the steady magnetic field can be maintained at a desired strength since the strength of the magnetic field generated by the electromagnet or the air-core coil is proportional to the strength of the current supplied thereto.

In the apparatus according to the present invention, the recording medium 23 comprises a rather thick substrate and an amorphous thin film of a magnetic material having the perpendicular magnetic anisotropy. Preferred examples of such a magnetic material are an alloy of a rare earth metal and a transition metal, for example, GdFe, GdCo, TbFe, TbGdFe, DyFe. Glass or plastic may be used as the material for the substrate.

The recording, reproduction and erasure of data on the disc may be carried out according to the same procedures as those already disclosed herein. As the laser beam used to carry out these procedures, gas lasers, for instance, a argon laser, a krypton laser, helium-cadmium laser, a helium-neon laser, or a semiconductor laser, for example, CSP (channelled-substrate planar) laser may be used.

Thus, according to the apparatus of this invention, it is possible to achieve the following effects:

(i) the size of the means for applying a variable magnetic field can be minimized, since the means for applying a magnetic field to the recording medium is divided into two different parts, i.e., a means for applying a steady magnetic field and a means for applying a variable magnetic field;

(ii) the inductance of the means for applying a magnetic field is quite low because of the miniaturization of the means for applying a variable magnetic field. As a result, response is also fast enough to carry out the magneto-optical recording, reproducing and erasing of data or information and it may be possible to record or erase data on every sector unit;

(iii) it is possible to simplify the structure of the current supply for the means for applying a variable magnetic field;

(iv) the apparatus may be applied to various kinds of magneto-optical discs having a different kind of recording and erasure properties by controlling the magnetic field generated from the means for applying a steady magnetic field to the record medium and adjusting the peak value of the pulse current supplied to the means for applying a variable magnetic field to the medium (such as an air-core coil).

EXAMPLE

Using an apparatus according to the present invention having the construction disclosed in FIG. 2 (a), a recording and erasure test was carried out on a recording medium composed of a thin magnetic film of TbFe having the perpendicular magnetic anisotropy.

In this example, the air-core coil used as the means for applying a variable magnetic field was a covered copper wire having a diameter of 0.1 mm, the coil having a length of 0.5 mm, an outer diameter of 6.0 mm, an inner diameter of 2.0 mm and 100 turns of wire. This coil provides a magnetic field of 260 Oe at the position of 0.5 mm away from the extremity of the coil.

The magneto-optical disc used was a plastic substrate having a guide groove (0.8 μm in width) and a thickness of 1.2 mm. A recording layer of TbFe film deposited on the substrate by the low temperature sputtering technique. The coercive force of the TbFe film was 2 KOe at room temperature.

Figure 4:
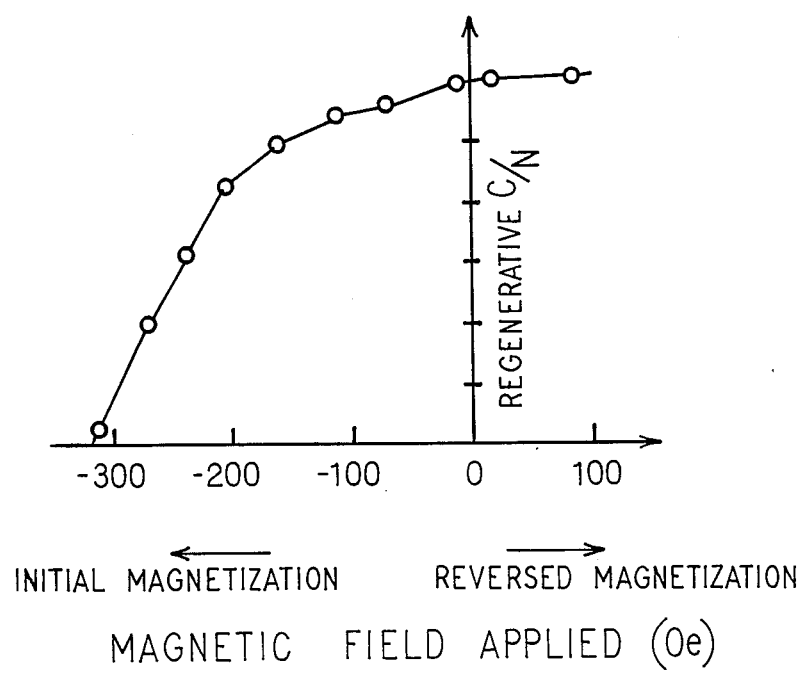

Data were recording on the record disc mentioned above by the use of the apparatus according to the present invention and the resulting recording property of the disc is shown in FIG. 4 in which the abscissa represents the applied magnetic field during recording, the left hand side thereof being the direction of initial magnetization and the right hand side thereof being the direction of reversed magnetization, and the ordinate is the regenerative C/N during the recording procedure. As seen from the results of FIG. 4, the regenerative C/N is saturated if the magnetic field applied is higher than 20 Oe in the direction of reversed magnetization.

Figure 5:
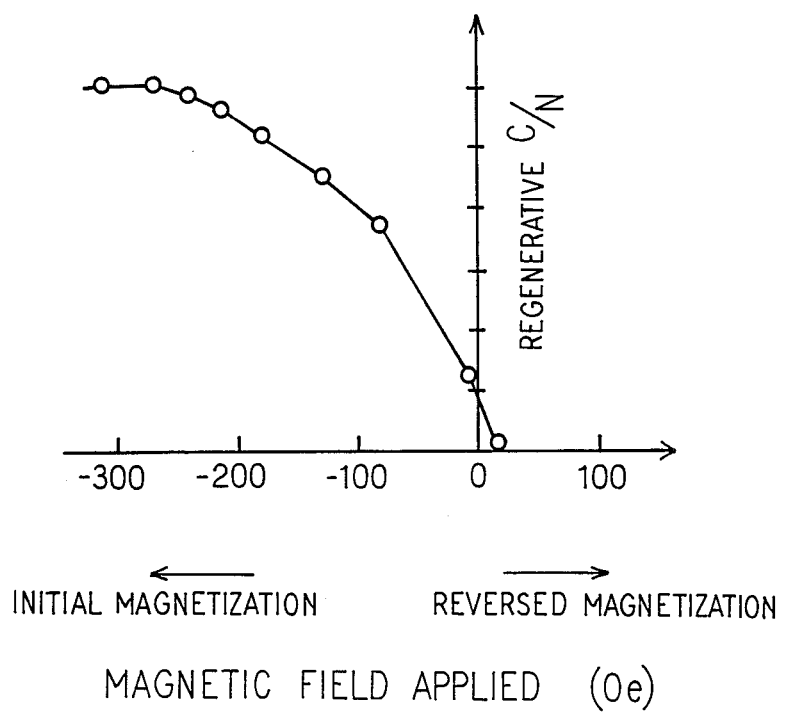

FIG. 5 represents the result of the measurement on re-recording property with respect to the strength of the magnetic field applied during the erasing procedure. In FIG. 5, the abscissa is the strength of magnetic field applied during erasing and the ordinate stands for the regenerative C/N during a re-recording procedure.

According to the result shown in FIG. 5, it is found that the regenerative C/N during re-recording is saturated and that the same level of recording property as that observed during the initial recording procedure is obtained when the strength of the magnetic field applied is higher than 270 Oe in the direction of initial magnetization.

As is clear from the results shown in FIGS. 4 and 5, the strength of the magnetic field required to record data is at least 20 Oe and that required to erase data is at least 270 Oe.

Then, the position of the head on which the permanent magnet is disposed and the magnetization condition of the permanent magnet which serves as the means for applying steady magnetic field on the disc were adjusted so that 130 Oe of magnetic field can always be applied to the disc surface in the direction of the initial magnetization. By supplying ±0.58 A of pulse current to the air-core coil, 20 Oe of magnetic field can be applied to the recording layer of the magneto-optical disc in the direction of the reversed magnetization during recording, while 280 Oe of magnetic field can be applied to the recording layer in the direction of the initial magnetization during erasing. These magnetic fields having the strength mentioned above were found to be applied to the desired position of the recording layer, situated 0.5 mm away from the extremity of the air-core coil.

Thus, the apparatus according to the present invention provides an excellent recording and erasure property when data or information are recorded on a magneto-optical recording medium having perpendicular magnetic anisotropy.

In the light of the above teachings, therefore, various modifications and variations of the present invention are contemplated and will be apparent to those skilled in the art without departing from the spirit and scope of this invention. For instance, a permanent magnet is used in the example, as the means for applying a steady magnetic field. However, an electromagnet or an air-core coil which are operated under a constant current can also be used effectively and furthermore, the magnets may be disposed within the recording head or the means for applying variable magnetic field may coaxially be disposed within the means for applying a steady magnetic field.

I claim:

1. An apparatus for magneto-optically recording, reproducing and erasing information, comprising:
   a magneto-optical recording medium including a recording layer initially magnetized in a first direction perpendicular to a surface of the recording layer;
   means for applying a laser beam onto said magnetooptical recording medium to record, reproduce and erase information in said recording layer;
   first means for applying a constant magnetic field to said recording layer in a location where said laser beam impinges upon said recording medium, said constant magnetic field having a first value in said first direction, said first means applying said constant magnetic field during both recording and erasing; and
   second means for applying a variable magnetic field to said recording layer in said location, said second means applying during recording, in a second direction opposite said first direction, a recording magnetic field having a second value which is greater than said first value, wherein a recording magnetic field having a value substantially equal to a difference between said first and second values is applied to said recording layer for recording information, said second means applying during erasing, in said first direction, an erasing magnetic field having said second value, wherein an erasing magnetic field having a value substantially equal to a sum of said first and second values is applied to said recording layer for erasing information.

2. An apparatus as set forth in claim 1, wherein said first means is a member selected from the group consisting of a permanent magnet, an electromagnet, and an air-core coil, wherein said first means has a constant current applied thereto.

3. An apparatus as set forth in claim 1, wherein said second means is a member selected from the group consisting of an electromagnet and an air-core coil.

4. An apparatus as set forth in claim 1, wherein said first means and said second means comprise a permanent magnet and a member selected from the group consisting of an electromagnet or an air-core coil respectively.

5. An apparatus as set forth in claim 4, wherein said first means and said second means are disposed on opposite sides of said recording medium.

6. An apparatus as set forth in claim 4, wherein said first means and said second means are disposed on the same side of said recording medium.

7. An apparatus as set forth in claim 1, wherein said magneto-optical recording medium has a thin amorphous layer composed of an alloy of a rare earth metal and a transition metal, and a substrate composed of a substance selected from the group consisting of glass and plastic, the amorphous layer being formed on said substrate.

* * * * *

UNITED STATES PATENT AND TRADEMARK OFFICE
CERTIFICATE OF CORRECTION

PATENT NO. : 4,862,437

DATED : August 29, 1989

INVENTOR(S) : Mitsuya Okada

It is certified that error appears in the above-identified patent and that said Letters Patent is hereby corrected as shown below:

Column 3, line 21, delete "(aa;" and insert --(a);--

Column 5, line 6, delete "24" and insert --27--

Signed and Sealed this

Twenty-eighth Day of August, 1990

Attest:

HARRY F. MANBECK, JR.

Attesting Officer

Commissioner of Patents and Trademarks